(12) United States Patent
Gunji et al.

(10) Patent No.: US 9,023,522 B2
(45) Date of Patent: May 5, 2015

(54) CATHODE FOR LITHIUM-ION SECONDARY BATTERY, LITHIUM-ION SECONDARY BATTERY, VEHICLE AND POWER STORAGE SYSTEM EQUIPPED WITH THE BATTERY

(75) Inventors: Akira Gunji, Mito (JP); Shin Takahashi, Mito (JP); Takashi Naito, Funabashi (JP); Tadashi Fujieda, Mito (JP)

(73) Assignee: Hitachi, Ltd., Tokyo (JP)

( * ) Notice: Subject to any disclaimer, the term of this patent is extended or adjusted under 35 U.S.C. 154(b) by 334 days.

(21) Appl. No.: 13/034,431

(22) Filed: Feb. 24, 2011

(65) Prior Publication Data

US 2011/0217592 A1 Sep. 8, 2011

(30) Foreign Application Priority Data

Mar. 5, 2010 (JP) .................................. 2010-048547

(51) Int. Cl.
*H01M 4/48* (2010.01)
*H01M 4/525* (2010.01)

(52) U.S. Cl.
CPC ................ *H01M 4/48* (2013.01); *H01M 4/525* (2013.01); *Y02E 60/122* (2013.01)

(58) Field of Classification Search
CPC ................................. H01M 4/48; H01M 4/525
USPC ................. 429/220, 221, 224, 231.95, 218.1, 429/231.1, 231.5, 231.6; 252/182.1
See application file for complete search history.

(56) References Cited

U.S. PATENT DOCUMENTS

2002/0090553 A1* 7/2002 Han et al. ...................... 429/224
2003/0224249 A1* 12/2003 Gorchkov et al. .......... 429/218.1

(Continued)

FOREIGN PATENT DOCUMENTS

| CN | 1795574 A | 6/2006 |
|----|-----------|--------|
| JP | 11-144734 | 5/1999 |

(Continued)

OTHER PUBLICATIONS

"Advances in manganese-oxide 'composite' electrodes for lithium-ion batteries", Thackeray et al., Journal of Materials Chemistry, 2005, 15, 2257-2267.*

(Continued)

*Primary Examiner* — Kenneth Douyette
(74) *Attorney, Agent, or Firm* — Baker Botts L.L.P.

(57) ABSTRACT

A cathode for a lithium-ion secondary battery is provided, which not only efficiently absorbs oxygen released from a solid solution based cathode active material when initial charging is applied but prevents a cathode energy density from lowering. Further, a lithium-ion secondary battery, a vehicle and a power storage system equipped with the lithium-ion secondary battery are provided. The cathode for a lithium-ion secondary battery comprises a cathode active material represented by the general formula: $xLi_2MO_3$-$(1-x)LiM'O_2$ (where $0<x<1$; M is at least one element selected from the group of Mn, Ti and Zr; and M' is at least one element selected from the group of Ni, Co, Mn, Fe, Ti, Zr, Al, Mg, Cr and V), and an oxygen absorbing substance having both oxygen absorbing and lithium-ion intercalation/de-intercalation abilities. Herein, the oxygen absorbing substance is disposed on the cathode active material.

8 Claims, 4 Drawing Sheets

(56) References Cited

U.S. PATENT DOCUMENTS

| | | |
|---|---|---|
| 2005/0084757 A1* | 4/2005 | Kweon et al. ............... 429/231.1 |
| 2008/0070122 A1 | 3/2008 | Park et al. |
| 2008/0083901 A1* | 4/2008 | Park ........................... 252/182.1 |
| 2009/0075165 A1* | 3/2009 | Park et al. ..................... 429/129 |
| 2009/0117463 A1* | 5/2009 | Takezawa et al. ............. 429/220 |
| 2009/0155694 A1* | 6/2009 | Park ......................... 429/231.95 |

FOREIGN PATENT DOCUMENTS

| | | |
|---|---|---|
| JP | 2006-114256 | 4/2006 |
| JP | 2008-078139 | 4/2008 |
| JP | 2008-270201 | 11/2008 |
| JP | 2009-076446 | 4/2009 |
| JP | 2009-146811 | 7/2009 |
| WO | WO 2004/107480 A2 | 12/2004 |

OTHER PUBLICATIONS

"Microstructure study of amorphous vanadium oxide thin films using raman spectroscopy", Lee et al., Journal of Applied Physics, vol. 92, No. 4, 1893-1897, Aug. 15, 2002.*

Armstrong et al., "Demonstrating Oxygen Loss and Associated Structural Reorganization in the Lithium Battery Cathode Li[$Ni_{0.2}Li_{0.2}Mn_{0.6}$]$O_2$," J. Am. Chem. Soc., 2006, 8694-8698, vol. 128.

Notice of Reasons for Rejection of JP Appln. No. 2010-048547 dated Aug. 21, 2012 with a partial English translation.

Chinese Notice of Reasons for Rejection of Appln. No. 201110045845.9 dated Apr. 17, 2013 with English translation.

* cited by examiner

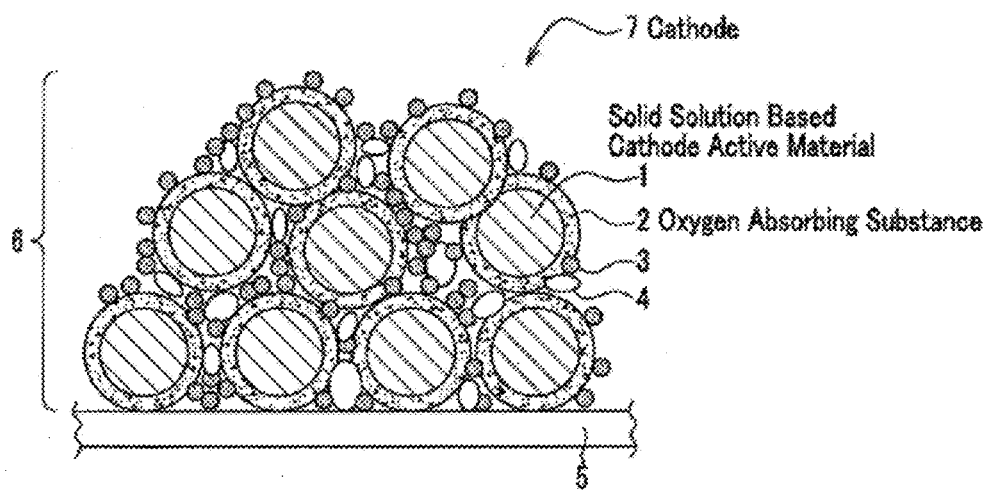
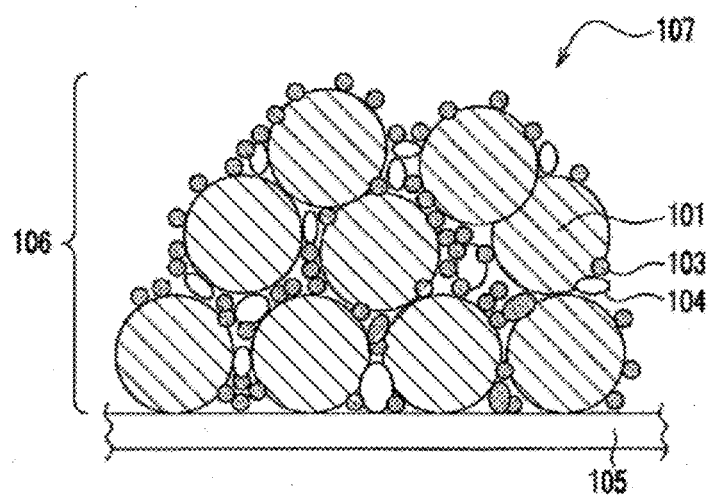

*Comparative Example*

CATHODE FOR LITHIUM-ION SECONDARY BATTERY, LITHIUM-ION SECONDARY BATTERY, VEHICLE AND POWER STORAGE SYSTEM EQUIPPED WITH THE BATTERY

CROSS REFERENCE TO RELATED APPLICATIONS

This application claims the foreign priority benefit under Title 35, United State Code, 119(a)-(d) of Japanese Patent Application No. 2010-048547, filed on Mar. 5, 2010 in the Japan Patent Office, the disclosure of which is herein incorporated by reference in its entirety.

BACKGROUND OF THE INVENTION

1. Field of the Invention

The present invention relates to a cathode for a lithium-ion secondary battery having a lithium-ion intercalation/de-intercalation ability, a lithium-ion secondary battery, a vehicle and a power storage system equipped with the battery.

2. Description of Related Art

Recently, there is an increasing demand for prevention of global warming and concern about depletion of fossil fuels. Much attention has been paid to the development of an electric automobile consuming less energy for travelling and a power generation system using natural energies such as solar light and wind power. However, the above mentioned technologies have the following problems, which prevent such technologies from being utilized widely.

A problem with an electric automobile is that a driving battery thereof has a low energy density, resulting in a short travelling distance after one time charging. On the other hand, a problem with a power generation system using natural energies is that the system requires a large capacity of battery for leveling a fluctuation of generated output due to the large fluctuation of power generating capacity. This may result in requiring a higher cost. Accordingly, in both technologies, it is demanded to develop an inexpensive secondary battery having a high energy density.

A lithium-ion secondary battery has a higher energy density per unit weight than such second batteries as a nickel-metal hydride battery and a lead battery. Herein, the lithium-ion secondary battery is expected to be applied to an electric automobile and a power storage system. For the application, the lithium-ion secondary battery needs to have a higher energy density to meet increasing demands for an electric automobile and a power generation system. The increase in the energy densities of the cathode and anode of the battery is required in order to increase the battery energy.

Here, $Li_2MO_3$—$LiM'O_2$ solid solution is expected as a cathode active material with a high energy density. Note that M is at least one element selected from the group of Mn, Ti and Zr, and M' is at least one element selected from the group of Ni, Co, Mn, Fe, Ti, Zr, Al, Mg, Cr and V. Hereinafter, $Li_2MO_3$—$LiM'O_2$ solid solution is referred to as a solid solution based cathode active material.

A solid solution of $Li_2MO_3$ having a layered structure and electrochemical inactivity and $LiM'O_2$ having a layered structure and electrochemical activity is a cathode active substance with a high capacity. The solid solution may have an electric power capacity more than 200 mAh/g activated by charging a lithium metal with a voltage more than 4.4 V when initial charging is applied (see Journal of the American Chemical Society, 128 (26), pp. 8694-8698 (2006)).

A cathode for a lithium-ion secondary battery disclosed in Japanese Laid-Open Patent Publication Nos. 11-144734 and 2009-146811, includes an oxygen absorbing substance, by which oxygen generated from the cathode if the battery is overcharged or at a high temperature is absorbed.

Further, in Japanese Laid-Open Patent Publication No. 11-144734, a lithium-ion secondary battery is disclosed, in which an oxygen absorbing substance consisting of a metal oxide is fixed to a conductive material to absorb the oxygen released from the cathode at a high temperature.

Japanese Laid-Open Patent Publication No. 2009-146811 discloses a material such as $LiMoO_2$ having a lithium-ion absorbing and releasing ability and an oxygen absorbing ability if the battery is overcharged is used as an oxygen absorbing substance, so as to prevent an energy density from lowering caused by the addition of the oxygen absorbing substance.

Further, Japanese Laid-Open Patent Publication No. 2009-76446 discloses a cathode for a lithium-ion secondary battery, comprising a cathode active material coated with vanadium oxide to improve conductivity of the solid solution based cathode active material.

Here, it should be noted that oxygen is released from a cathode when a solid solution based cathode active material is activated with charging on a voltage more than 4.4V described in Journal of the American Chemical Society, 128 (26), pp. 8694-8698 (2006). The released oxygen may cause a problem to destroy an electron conductive network in a cathode by reacting with a conductive material in the cathode. Further, an oxygen gas thus vaporized may increase an internal pressure in the battery to break a battery container. Moreover, the oxygen may react with an electrolyte solution, which results in lowering the capacity.

In the cathode of Japanese Laid-Open Patent Publication No. 11-144734, the oxygen absorbing substance does not have a lithium-ion absorbing and desorbing ability, resulting in significant decrease of the energy density per weight of the cathode. Further, since the oxygen absorbing substance is fixed to the conductive material, the absorbing efficiency of oxygen thereof is poor.

In the cathode of Japanese Laid-Open Patent Publication No. 2009-146811, the oxygen absorbing substance after absorbing oxygen does not have a sufficient lithium-ion absorbing and desorbing ability in a range of the general operating voltage (2-5V for lithium metal). Accordingly, this may also decrease the energy density when the solid solution based cathode active material releasing oxygen when initial charging is applied is used.

In the cathode of Japanese Laid-Open Patent Publication No. 2009-76446, vanadium oxide ($VO_x[2 \leq x<2.5]$, and $V_2O_5$) used for coating a cathode active material does not have a lithium-ion absorbing and desorbing ability and an oxygen absorbing ability simultaneously. Herein, a $VO_X$-based material does not have a lithium-ion absorbing and desorbing ability, and $V_2O_5$ has a poor oxygen absorbing ability, resulting in a lower energy density of the cathode.

SUMMARY OF THE INVENTION

In view of the above mentioned problems, an object of the present invention is to provide a cathode for a lithium-ion secondary battery, which not only efficiently absorbs oxygen released from a solid solution based cathode active material when initial charging is applied but prevents a cathode energy density from lowering. Another object of the present invention is to provide a lithium-ion secondary battery using the above mentioned cathode, and to provide a vehicle and a power storage system equipped with the lithium-ion secondary battery.

Therefore, in order to achieve the above mentioned objects, in a first aspect, the present invention provides a cathode for a lithium-ion secondary battery of which cathode active material is represented as $xLi_2MO_3$-$(1-x)$ $LiM'O_2$. Herein, an oxygen absorbing substance having not only an oxygen absorbing ability but a lithium-ion intercalation/de-intercalation ability even after absorbing oxygen is disposed on the cathode active material. Note that x is in a range of $0 < x < 1$; M is at least one element selected from the group of Mn, Ti and Zr; and M' is at least one element selected from the group of Ni, Co, Mn, Fe, Ti, Zr, Al, Mg, Cr and V.

In a second aspect, the present invention provides a lithium-ion secondary battery comprising the cathode for the lithium-ion secondary battery of the first aspect of the present invention.

In a third aspect, the present invention provides a vehicle equipped with the lithium-ion secondary battery of the second aspect of the present invention.

In a fourth aspect, the present invention provides a power storage system equipped with the lithium-ion secondary battery of the second aspect of the present invention.

According to the present invention, a cathode for a lithium-ion secondary battery, which not only efficiently absorbs oxygen released from a solid solution based cathode active material when initial charging is applied but prevents a cathode energy density from lowering, can be realized. Further, a lithium-ion secondary battery, a vehicle and a power storage system each equipped with the lithium-ion secondary battery can be also realized.

BRIEF DESCRIPTION OF THE DRAWINGS

FIG. 1 is a schematic diagram showing a cathode in an embodiment of the present invention.

FIG. 2 is a schematic diagram showing a conventional cathode in a Comparative Example including no oxygen absorbing substance.

DETAILED DESCRIPTION OF THE PREFERRED EMBODIMENT

Figure 3:
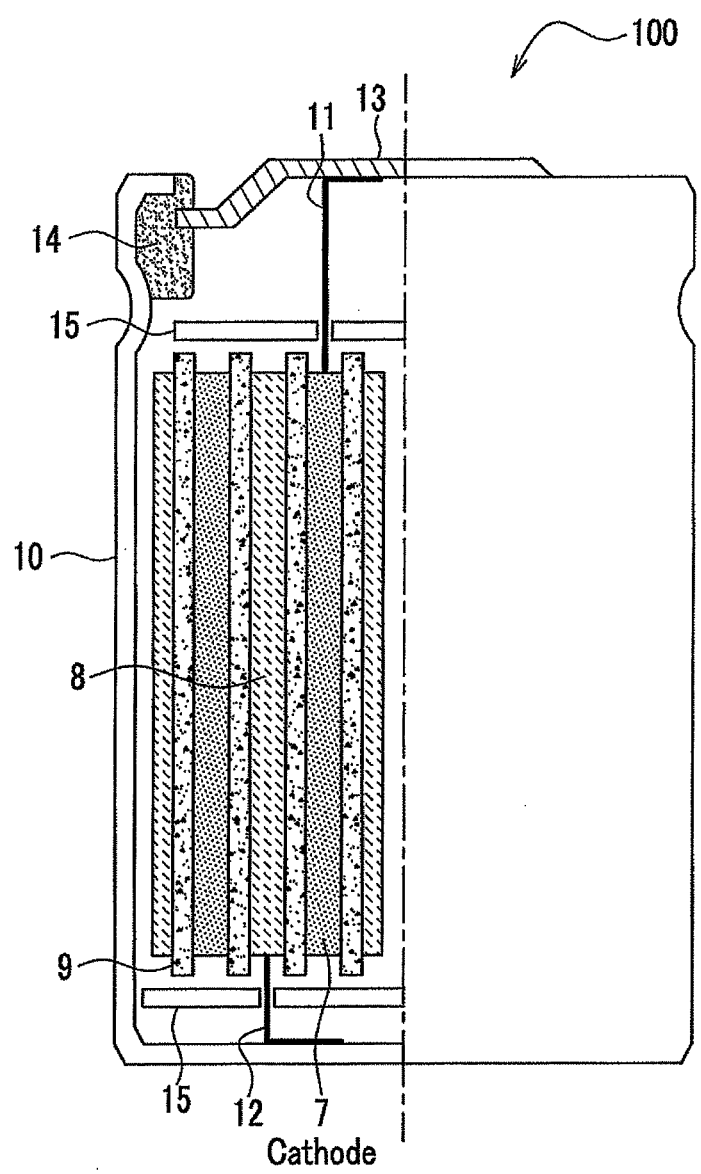
FIG. 3 is a longitudinal half cross-sectional diagram showing a structure of a cylinder shaped battery in Example 1.

Next, an embodiment of the present invention will be explained in reference to the attached drawings.

The embodiment of the present invention is shown as an example, and the present invention is not limited to the embodiment described hereinafter.

A lithium-ion secondary battery having a cathode of the present invention has a structure similar to a conventional basic battery structure. For example, the lithium-ion secondary battery may comprise: a cathode, an anode, a separator which is held between the cathode and the anode and impregnated in an organic electrolyte solution. Herein, the separator separates the cathode and the anode to prevent short-circuit, and has an ion, conductivity for lithium ions ($Li^+$) passing.

FIG. 1 is a schematic diagram showing a cathode 7 in an embodiment of the present invention, while FIG. 2 shows a conventional cathode 107 including no oxygen absorbing substance in Comparative Example.

Conventionally, as shown in FIG. 2 in Comparative Example, a cathode has a structure in which a cathode layer 106 is formed on a current collector 105 made of a metal foil or the like. Herein, the cathode layer 106 comprises a cathode active material 101 made of an electromotive material participating in a battery reaction in the cathode 107 to generate an electric power, a conductive material 103 providing conductivity, and a binder 104 made of a binding agent.

In contrast, as shown in FIG. 1, in the present invention, a solid solution based cathode active material 1 ($Li_2MO_3$—$LiM'O_2$ solid solution) is used as a cathode active material, and an oxygen absorbing substance 2 is disposed on the solid solution based cathode active material 1. Herein, the oxygen absorbing substance 2 has an oxygen absorbing ability and a lithium-ion intercalation/de-intercalation ability after absorbing oxygen. This structure can prevent the performance of the solid solution based cathode active material 1 from lowering, caused by the oxygen generated from the solid solution based cathode active material 1 when initial charging is applied. Accordingly, a cathode for a lithium-ion secondary battery (cathode 7) is obtained, having a high energy density. Note in $Li_2MO_3$—$LiWO_2$ solid solution (the solid solution based cathode active material 1), M is at least one element selected from the group of Mn, Ti and Zr; M' is at least one element selected from the group of Ni, Co, Mn, Fe, Ti, Zr, Al, Mg, Cr and V.

The cathode of the present invention comprises: a solid solution based cathode active material 1 and an oxygen absorbing substance 2 having an oxygen absorbing ability and a lithium-ion intercalation/de-intercalation ability after absorbing oxygen, as the essential components thereof. Besides the essential components, the cathode of the present invention may include materials conventionally used in a cathode, for example, a conductive material 3 and a binder 4. Herein, a cathode layer 6 is constituted by the solid solution based cathode active material 1, the oxygen absorbing substance 2, the conductive material 3, and the binder 4. The cathode layer 6 and a current collector 5 on which the cathode layer 6 is formed constitute a cathode 7.

Meanwhile, a reaction of the solid solution based cathode active material 1, which occurs when initial charging with a voltage more than 4.4V is applied, has not been clearly elucidated. However, according to some publications, it is considered that oxygen may be released to complement electrical charges (that is, to satisfy the electrically neutral condition) which corresponds to lithium-ions coming off from electrochemically inactive $Li_2MO_3$ when initial charging with a voltage more than 4.4V is applied, as shown in the following chemical reaction.

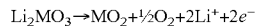

$$Li_2MO_3 \rightarrow MO_2 + \frac{1}{2}O_2 + 2Li^+ + 2e^-$$

Further, it is known that the discharge capacity of the solid solution based cathode active material 1 is smaller than the charge capacity thereof when initial charging with a voltage more than 4.4V is applied. This indicates the presence of lithium-ions ($Li^+$) which are absorbed/stored in an anode after initial charging on a voltage more than 4.4V without being used.

The oxygen absorbing substance 2 of the present invention is not limited to a specific material as long as the oxygen absorbing substance 2 can absorb oxygen released from the solid solution based cathode active material 1 and have a lithium-ion intercalation/de-intercalation ability after absorbing the oxygen. For example, the oxygen absorbing substance 2 includes such oxygen deficient materials as $V_2O_{5-\alpha}$, $MnO_{2-\beta}$ and $MoO_{2-\gamma}$ ($0<\alpha<2$, $0<\beta<1$, $0<\gamma<1$), which are prepared by reducing (that is, removing oxygen (O) from) $V_2O_5$, $MnO_2$ and $MoO_2$ each having a lithium-ion intercalation/de-intercalation ability, thereby to generate oxygen deficiency.

The oxygen absorbing substance 2 absorbs oxygen released from the solid solution based cathode active material 1 when initial charging with a voltage more than 4.4V is applied. The chemical reaction is shown in the following equation when $V_2O_{5-\alpha}$ is used.

$$V_2O_{5-\alpha} + (\alpha/2)O_2 \rightarrow V_2O_5$$

Here, the oxygen absorbing substance 2 is disposed on the solid solution based cathode active material 1. This structure allows the oxygen absorbing substance 2 to efficiently absorb the oxygen released from the solid solution based cathode active material 1. Preferably, the solid solution based cathode active material 1 is coated with the oxygen absorbing substance 2 in order to achieve the above mentioned effect of the present invention (see FIG. 1).

Herein, a method for arranging the oxygen absorbing substance 2 on the solid solution based cathode active material 1 is not limited to a specific process. The method may include a mechanically cladding process, and a thermal deposition process after coating the solid solution based cathode active material 1 with a precursor of the oxygen absorbing substance 2.

The oxygen absorbing substance 2 after absorbing oxygen has a lithium-ion intercalation/de-intercalation ability. Therefore, the oxygen absorbing substance 2 directly participates in a battery reaction in the cathode to perform as a cathode active substance for generating electric power. When $V_2O_5$, is used for an oxygen absorbing substance 2, the charge and discharge reaction of $V_2O_5$ after absorbing oxygen is represented by the following equation, in which a reaction in the right direction ($\rightarrow$) means discharging and a reaction in the left direction ($\leftarrow$) means charging.

$$V_2O_5 + nLi^+ + ne^- \Leftrightarrow Li_nV_2O_5$$

As mentioned above, there is a difference between charge and discharge capacities of the solid solution based cathode active material 1 when initial charging is applied, which leaves unused lithium-ions ($Li^+$) absorbed/stored in the anode. Therefore, it is not necessary that lithium is included in the oxygen absorbing substance 2 (that is, $V_2O_5$ in this case).

Further, it is not necessary that the oxygen absorbing substance 2 has high crystallinity, and the oxygen absorbing substance 2 may be made from an amorphous material. In the case of $V_2O_{5-\alpha}$ ($0<\alpha<2$), $V_2O_{5-\alpha}$ has a layered crystalline structure to conduct lithium-ions ($Li^+$) in the two dimensional space between the layers.

When the crystallinity of the oxygen absorbing substance 2 is high, a distance between the crystalline layers is as small as about 4.4 Å, resulting in decreasing a movable space of lithium-ions and lowering the conduction speed of lithium-ions. Accordingly, this increases the over-voltage (electrode potential) during charging and discharging. On the other hand, in the case of the amorphous form, a distance between the crystalline layers is increased to about 10 Å, resulting in an increase of the conduction speed of lithium-ions and decrease of the over-voltage (electrode potential) during charging and discharging. Accordingly, in the case of $V_2O_{5-\alpha}$ ($0<\alpha<2$), it is preferable that $V_2O_{5-\alpha}$ does not have high crystallinity but partially has an amorphous form. The degree of the crystallinity can be controlled by a calcination temperature and an addition of a small amount of additives such as phosphor (P).

As mentioned previously, a cathode layer 6 may include a conductive material 3. The conductive material 3 is made of such a carbon material as generally used including carbon black, acetylene black and graphite. Further, as mentioned hereinbefore, the cathode layer 6 may include a binder 4. The binder 4 made of PVdF (PolyVinylidene diFluoride) is generally used.

EXAMPLE

Example 1

Hereinafter, will be described Example 1, while Example 1 is exemplary to explain the present invention in detail. It should be noted that the present invention is not limited to Example 1 and various modifications may be made without departing from the spirit or scope of the present invention.

(Preparation of Solid Solution Based Cathode Active Material)

Salts of the metallic elements represented by M and M' of $Li_2MO_3$—$LiM'O_2$ with high water solubility such as sulfate and nitrate were used, in which M is at least one element selected from the group of Mn, Ti and Zr, and M' is selected from at least one element selected from the group of Ni, Co, Mn, Fe, Ti, Zr, Al, Mg, Cr and V. For example, predetermined weights of nickel sulfate 6-hydrate ($NiSO_4$ $6H_2O$), cobalt sulfate 7-hydrate ($CoSO_4$ $7H_2O$), manganese sulfate 5-hydrate ($MnSO_4$ $5H_2O$) were taken and these salts were dissolved in pure water to prepare a mixed solution.

While stirring the mixed solution, $Na_2CO_3$ aqueous solution was dropped in the mixed solution until the pH value became 7.5, to coprecipitate a composite carbonate of Ni, Co and Mn. The composite carbonate thus precipitated was filtered under reduced pressure, washed with water, and dried at 120° C. for 5 hr. To the product thus obtained was added a predetermined amount of a lithium salt, for example, LiOH $H_2O$ or $Li_2CO_3$, and the materials were mixed by a ball mill. Then, the mixture thus obtained was placed in an alumina crucible, pre-calcined at 500° C. for 12 hr, and the product was mixed and ground again. After the treatment, the product was calcined at 900° C. for 12 hr to obtain a powder of a solid solution based cathode active material 1.

(Composite of Solid Solution Based Cathode Active Material 1 and Oxygen Absorbing Substance 2)

The powder of the solid solution based cathode active material 1 was stirred in a vanadium alkoxide solution so that vanadium alkoxide adhered thereto. Then, the powder thus obtained was calcined at 400° C. In the calcination process, vanadium alkoxide was decomposed to produce vanadium (V) oxide ($V_2O_5$), and vanadium (V) oxide was reduced by carbon (C) contained therein to generate oxygen deficiency.

Herein, it is preferable that the calcination is performed under an inert atmosphere such as $N_2$ so as to generate the oxygen deficiency. Further, amorphous $V_2O_{5-\alpha}$ having little crystallinity was obtained by setting the calcination temperature at about 400° C. Alternatively, instead of setting the calcination temperature at a lower level, a formation of $V_2O_{5-\alpha}$ with high crystallinity and low ion diffusion ability may be prevented by adding a small amount of additives such as P or the like. By using the methods as mentioned above, a powder of the solid solution based cathode active material 1 coated with amorphous $V_2O_{5-\alpha}$ was obtained.

(Preparation of Cathode 7)

A solid solution based cathode active material 1 coated with amorphous $V_2O_{5-\alpha}$, a carbon based conductive material 3, and a binder 4 dissolved in N-methyl-2-pyrrolidinone (NMP) in advance, were mixed in a rate of 87:8:5 (by mass %)

to form a slurry homogeneously mixed. The slurry thus prepared was applied onto a current collector 5 made of an aluminum foil having a thickness of 20 μm. Then, the current collector 5 was dried at 120° C., and pressed in compression molding to have an electrode density of 2.5 g/cm$^3$.

(Preparation of Lithium-Ion Secondary Battery)

Next, a method for preparing a lithium-ion secondary battery will be described.

The cathode 7 of the present invention can be used in any shaped lithium-ion secondary battery including cylindrical, flat, square, coin, button, and sheet type batteries. As a representative example, a structure of a cylindrical type battery (lithium-ion secondary battery) 100 is shown in FIG. 3 as a longitudinal half cross-sectional diagram thereof.

It is preferable that an anode 8 has a lower discharge potential. Hereby, for the anode 8, a variety of materials having a low discharging potential and a high weight per volume can be used, including Si, Sn, and lithium titanate ($Li_4Ti_5O_{12}$) or the like.

The lithium-ion secondary battery was prepared by using the above mentioned cathode 7, the anode 8, the separator 9, and the electrolyte solution (or electrolyte).

Herein, lithium metal was used for the anode 8, and a porous separator made of polypropylene (PP) having ion conductive and insulation properties was used for the separator 9. The electrolyte solution (or electrolyte) was prepared by dissolving lithium hexafluorophosphate ($LiPF_6$) in the mixture of none-aqueous ethylene carbonate (EC) and ethyl methyl carbonate (EMC) as organic solvents at a volume rate of 1:2, at a concentration of 1 mol/L.

Hereinafter, preparation of a cylindrical type battery (lithium-ion secondary battery) 100 will be described.

The cathode 7 and the anode 8 thus obtained as mentioned above, were spirally wound via the porous separator 9 made of polypropylene (PP), and housed in a cylindrical shaped battery can 10. The cathode 7 was electrically connected to a sealed cap 13 through a cathode lead 11. The anode 8 was electrically connected to a bottom of the battery can 10 through an anode lead 12.

Further, the battery can 10 at the anode side was electrically insulated to the sealed cap 13 at the cathode side by a packing 14 made of an insulating and sealing material, and the battery was internally sealed. Herein, an insulating plate 15 was inserted between the cathode 7 and the anode-side battery can 10 for insulation thereof. In addition, another insulating plate 15 was inserted between the anode 7 and the cathode-side sealed cap 13 for insulation thereof. Finally, an electrolyte solution (or electrolyte) was poured into the battery through a pouring inlet (not shown) arranged on the battery can 10 to obtain a cylindrical type battery 100 (lithium-ion secondary battery).

Comparative Example

Next, a comparative example will be described in detail.

In the comparative example, as shown in FIG. 2, a cathode 107 is constructed in a structure in which an oxygen absorbing substance is not disposed on a solid solution based cathode active material 101. The performance of the cathode 107 is evaluated compared to that of the cathode 7, in which the oxygen absorbing substance 2 is disposed on the solid solution based cathode active material 1 in Example 1 as shown in FIG. 1.

(Preparation of Cathode in Comparative Example)

A solid solution based cathode active material was prepared in the same method as in Example 1. The solid solution based cathode active material 101 thus prepared, a carbon based conductive material 103, and a binder 104 dissolved in N-methyl-2-pyrrolidinone (NMP) in advance, were mixed in a rate of 87:8:5 (by mass %) to form a slurry homogeneously mixed. The slurry thus prepared was applied onto a current collector 105 made of an aluminum foil having a thickness of 20 μm. Then, the current collector 105 was dried at 120° C., and pressed in compression molding to have an electrode density of 2.5 g/cm$^3$ ($2.5 \times 10^{-6}$ g/m$^3$).

(Preparation of Anode, Separator, Electrolyte Solution, and Lithium-Ion Secondary Battery in Comparative Example)

A lithium-ion secondary battery was prepared by using the cathode 107 of Comparative Example, an anode, a separator and an electrolyte solution, with the same method as in Example 1 shown in FIG. 3.

Similarly to Example 1, lithium metal was used for the anode, a porous separator made of polypropylene (PP) was used for the separator. The electrolyte solution (or electrolyte) was prepared by dissolving lithium hexafluorophosphate ($LiPF_6$) in the mixture of none-aqueous ethylene carbonate (EC) and ethyl methyl carbonate (EMC) as organic solvents at a volume rate of 1:2, at a concentration of 1 mol/L.

(Evaluation of Lithium-Ion Secondary Batteries of Example 1 and Comparative Example)

The lithium-ion secondary batteries each having the cathode 7 in Example 1 or the cathode 107 in Comparative Example were charged to 4.6V with constant current/constant voltage charging at a rate of 0.3 C, and discharged to 2.5V with the same constant current at a rate of 0.3 C, whereby the discharged capacity was measured. Herein, "a charge/discharge rate of 1 C" means a current rate so that 100% of charge is completed within one hour when a battery is charged from a completely discharged state and that 100% of discharge is completed within one hour when a battery is discharged from a completely charged state. In other words, charging or discharging is performed in the rate of 100% per one hour. Therefore, a rate of 0.3 C means that charging or discharging is performed in the rate of 30% per one hour.

Table 1 shows the results of the evaluation test on discharge capacities in Example 1 and Comparative Example.

TABLE 1

| | Discharge Capacity [mAh/g] |
|---|---|
| Example 1 | 192 |
| Comparative Example | 195 |

Discharge capacities of Example 1 and Comparative Example were 192 mAh/g and 195 mAh/g, respectively. There is no significant difference between Example 1 and Comparative Example.

Figure 4:
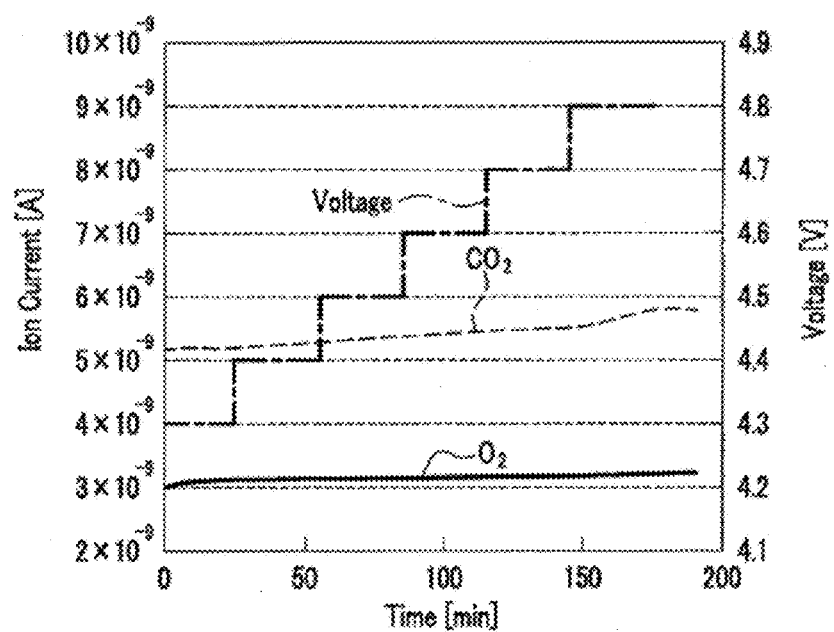
FIG. 4 is a graphic diagram showing a result of a gas generation analysis at the time of charging in Example 1.
Figure 5:
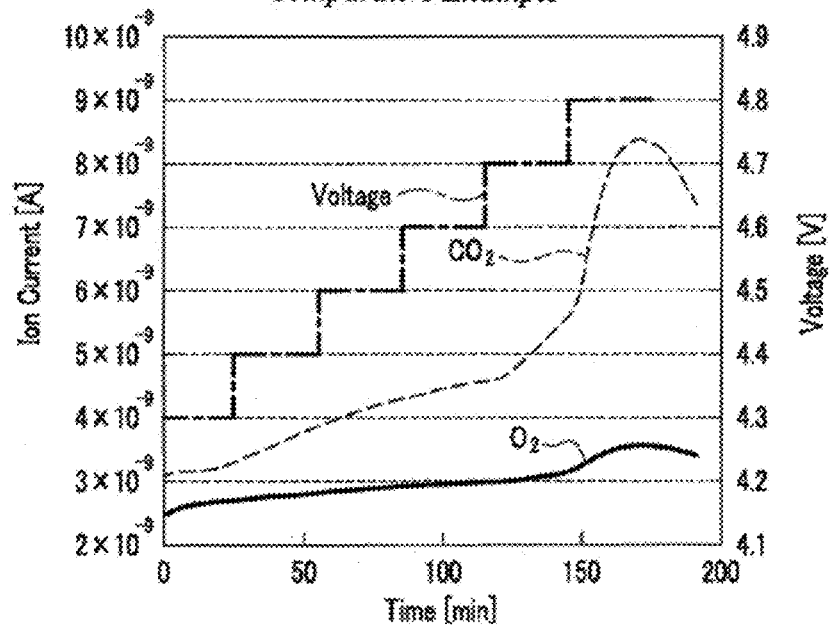
FIG. 5 is a graphic diagram showing a result of a gas generation analysis at the time of charging in a Comparative Example.

FIGS. 4 and 5 show results of the gas analysis in Example 1 and Comparative Example, respectively.

Each of the lithium-ion secondary batteries comprising the cathode in Example 1 or Comparative Example was charged to 4.3V with a constant current, and further charged for 30 min on a constant voltage among 4.4V, 4.5V, 4.6V, 4.7V and 4.8V (referred to FIGS. 4 and 5, wherein the dash-dotted lines exhibit the voltage in Example 1 (in FIG. 4) and Comparative Example (in FIG. 5), respectively.

Then, the gas generated in the battery during the constant voltage charging was analyzed by a quadrupole mass spectrometer. As shown in FIG. 5, while the battery in Comparative Example was being charged, a peak corresponding to a release of $O_2$ (referred to the solid line in FIG. 5) and a peak corresponding to a release of $CO_2$ (referred to the broken line in FIG. 5) were detected, respectively.

In contrast, as shown in FIG. 4, a peak corresponding to a release of $CO_2$ (referred to the broken line in FIG. 4) was small, and no peak corresponding to a release of $O_2$ (referred to the solid line in FIG. 4) was detected in Example 1.

These results demonstrate that the amounts of the gas generation ($O_2$ and $CO_2$) can be reduced without decreasing the discharge capacity as shown in Example 1 of the present invention, when compared to Comparative Example.

Example 2

A battery module using at least one lithium-ion secondary battery comprising the cathode 7 of the present invention shown in Example 1 is applicable to a power source used in a variety of vehicles. These vehicles include, for example, a hybrid train running with an engine and a motor, an electric automobile running with a motor using a battery as a power source, a hybrid automobile, a plug-in hybrid automobile capable of charging a battery from the outside, and a fuel cell automobile equipped with a fuel cell generating an electric power through the electrochemical reaction between hydrogen and oxygen.

Figure 6:
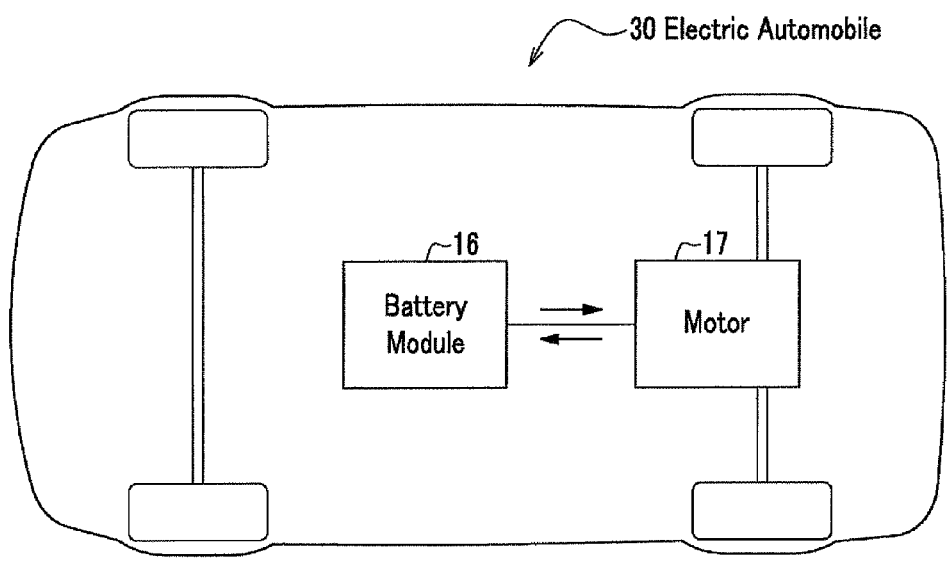
FIG. 6 is a schematic plan view showing a driving system of an electric automobile in Example 2.

FIG. 6 is a schematic plan view showing a driving system of an electric automobile 30 (or vehicle) as a representative example.

Here, an electric power is supplied to a motor 17 from a battery module 16 through a battery controller and a motor controller or the like (not shown) to drive the electric automobile 30. Further, an electric power regenerated by the motor 17 during deceleration is stored in the battery module 16 through the battery controller.

In Example 2, the battery module 16 comprises at least one lithium-ion secondary battery having the cathode 7 of the present invention. This allows improvement of the output, life cycle and safety of the battery with maintaining a high energy density thereof, resulting in improvement of the system reliability of the electric automobile (or vehicle) 30.

Note that the battery module 16 is applicable to a variety of vehicles besides the above-mentioned examples, including a forklift, a local carrying vehicle in a factory or the like, an electric wheelchair, various types of satellites, a rocket, and a submarine. Hereby, such a vehicle is not limited to a specific example as long as the vehicle comprises the battery (or cell).

Example 3

Figure 7:
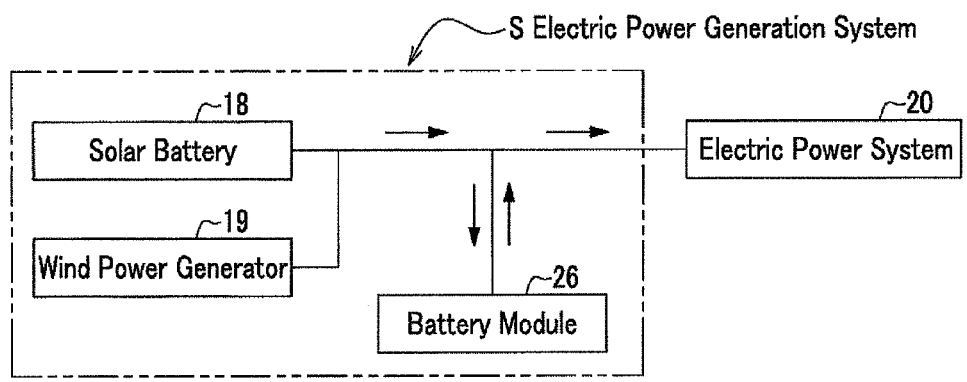
FIG. 7 is a schematic diagram showing a power generation system using natural energies in Example 3.

A battery module using at least one lithium-ion secondary battery comprising the cathode 7 of the present invention shown in Example 2 is applicable to a power storage source included in a solar battery 18 for converting a solar light energy into an electric power, or a power generation system (or power storage system) S using natural energies such as a wind power generator for generating an electric power by a wind power. FIG. 7 shows a schematic diagram explaining the system.

It should be noted that the amount of power generation is unstable in a power generation system using natural energies such as a solar battery 18 and a wind power generator 19. Therefore, charging/discharging of the electric power for the power storage source is needed to be optimized in accordance with a variable load of an electric power system 20, in order to stably supply the power.

A battery module 26 using at least one lithium-ion secondary battery comprising the cathode 7 of the present invention is applicable to the above mentioned power storage source. This allows improvement of the life cycle and safety of the battery with maintaining a high energy density thereof, resulting in improvement of the reliability of the power generation system (or power storage system) S.

Hereinbefore, a power generation system using a solar battery 18 and a wind power generator 19 has been exemplified as a power storage system. However, the power storage system is not limited to the above-mentioned examples. A variety of power storage systems having other power generators are applicable in the present invention.

According to the present invention, the oxygen absorbing substance 2 is disposed on the solid solution based cathode active material 1 as shown in FIG. 1. This arrangement allows oxygen generated from the solid solution based cathode active material 1 when initial charging is applied to be efficiently absorbed so as not to react with the conductive material 3 and the electrolyte solution. Accordingly, this prevents performance deterioration of the battery and breakage of the battery container (battery can 10 in FIG. 3). Further, the oxygen absorbing substance 2 has a lithium-ion intercalation de-intercalation ability. Accordingly, even when the oxygen absorbing substance 2 is disposed on the cathode active material (or solid solution based cathode active material 1), the lithium-ion intercalation/de-intercalation ability of the cathode active material (or solid solution based cathode active material 1) is not inhibited by the arrangement. Moreover, the oxygen absorbing substance 2 has a lithium-ion intercalation/de-intercalation ability even after absorbing oxygen. This facilitates the oxygen absorbing substance 2 to perform lithium-ion intercalation/de-intercalation even after absorbing the oxygen generated from the solid solution based cathode active material 1 when initial charging is applied. As a result, the decrease in the cathode energy density can be prevented.

What is claimed is:

1. A cathode for a lithium-ion secondary battery comprising:
    particles of a cathode active material; and
    a coating disposed on particles of the cathode active material, the coating comprising an amorphous oxygen absorbing substance,
    the oxygen absorbing substance coating particles of the cathode active material having both oxygen absorbing and lithium-ion intercalation/de-intercalation abilities.
    the cathode active material represented by a general formula:

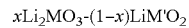
    $x\text{Li}_2\text{MO}_3\text{-}(1-x)\text{LiM'O}_2$ where $0<x<1$; M is at least one element selected from the group of Mn, Ti and Zr; and M' is at least one element selected from the group of Ni, Co, Mn, Fe, Ti, Zr, Al, Mg, Cr and V,
    wherein the coating is only on particles of the cathode active material,
    wherein the oxygen absorbing substance is a transition metal oxide having oxygen deficiency, and
    wherein the oxygen absorbing substance includes at least the transition metal oxide represented by $V_2O_{5-\alpha}$, $MnO_{2-\beta}$, or $MoO_{2-\gamma}$, where $0<\alpha<2$, $0<\beta<1$, and $0<\gamma<1$.

2. The cathode for a lithium-ion secondary battery as described in claim 1, wherein the particles of the cathode active material comprise powder.

3. A lithium-ion secondary battery comprising the cathode for a lithium-ion secondary battery as described in claim 1.

4. A vehicle equipped with the lithium-ion secondary battery as described in claim 3.

5. A power storage system equipped with the lithium-ion secondary battery as described in claim 3.

6. The cathode for a lithium-ion secondary battery as described in claim 1, wherein the oxygen absorbing substance coating particles of the cathode active material has both the oxygen absorbing ability before an initial charging and the lithium-ion intercalation/de-intercalation ability after absorbing oxygen generated by the initial charging, and wherein the cathode active material releases oxygen by the initial charging.

7. A cathode for a lithium-ion secondary battery comprising:

particles of a cathode active material;

a coating disposed on particles of the cathode active material, the coating comprising an amorphous oxygen absorbing substance; and a conductive material, the oxygen absorbing substance having both oxygen absorbing and lithium-ion intercalation/de-intercalation abilities, the cathode active material represented by a general formula:

$$xLi_2MO_3\text{-}(1-x)LiM'O_2$$

where $0<x<1$; M is at least one element selected from the group of Mn, Ti and Zr; and M' is at least one element selected from the group of Ni, Co, Mn, Fe, Ti, Zr, Al, Mg, Cr and V, and wherein the coating is only on particles of the cathode active material, wherein the oxygen absorbing substance is a transition metal oxide having oxygen deficiency, and wherein the oxygen absorbing substance includes at least the transition metal oxide represented b $V_2O_{5-\alpha}$, $MnO_{2-\beta}$, or $MoO_{2-\gamma}$, where $0<\alpha<2$, $0<\beta<1$ and $0<\gamma<1$.

8. The cathode for a lithium-ion secondary battery as described in claim 7, wherein the oxygen absorbing substance coating particles of the cathode active material has both the oxygen absorbing ability before an initial charging and the lithium-ion intercalation/de-intercalation ability after absorbing oxygen generated by the initial charging, and wherein the cathode active material releases oxygen by the initial charging.

* * * * *